June 2, 1953 — O. J. B. ORWIN — 2,640,585
CONVEYER CHAIN
Filed June 30, 1949 — 3 Sheets-Sheet 1
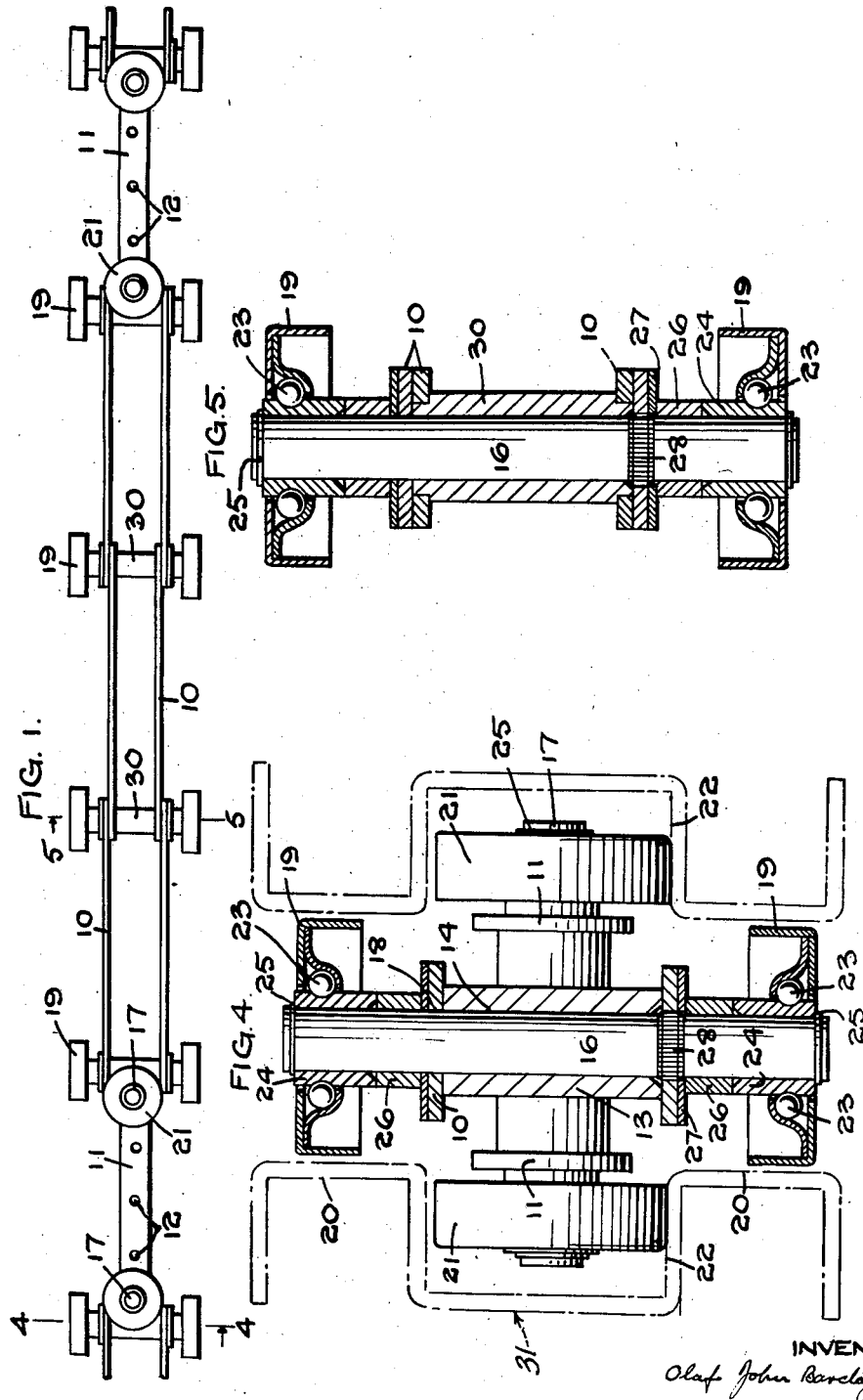

June 2, 1953   O. J. B. ORWIN   2,640,585
CONVEYER CHAIN
Filed June 30, 1949   3 Sheets-Sheet 2
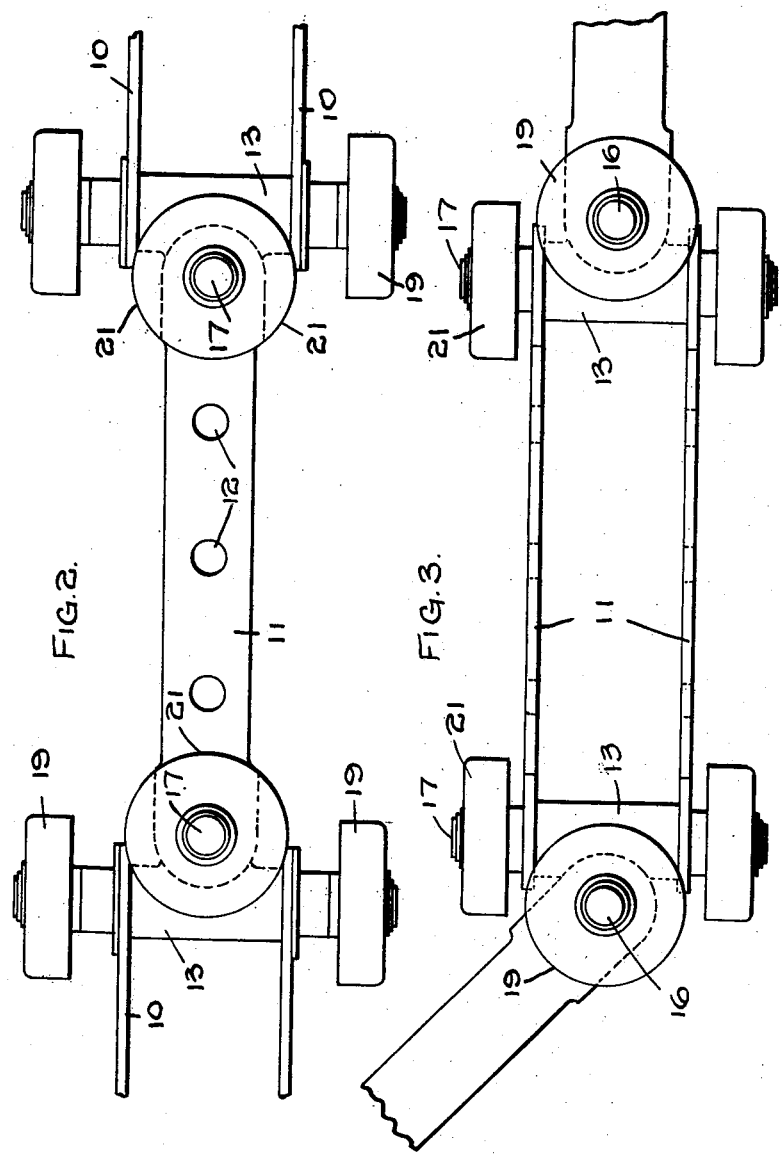
INVENTOR
Olaf John Barclay Orwin
BY
Richardson, David and Nordon
ATTY's June 2, 1953     O. J. B. ORWIN     2,640,585
CONVEYER CHAIN Filed June 30, 1949     3 Sheets-Sheet 3

INVENTOR
Olaf John Barclay Orwin
BY
Richardson, David and Nodor
ATTYS

Patented June 2, 1953

2,640,585

UNITED STATES PATENT OFFICE 2,640,585

CONVEYER CHAIN

Olaf John Barclay Orwin, Smethwick, England, assignor to Fisher & Ludlow Limited, Smethwick, England, a British company Application June 30, 1949, Serial No. 102,355
In Great Britain July 10, 1948

6 Claims. (Cl. 198—189)

1

This invention relates to conveyor chains such as are used for conveying material or goods, of the kind comprising pairs of links extending longitudinally of the chain and connected pivotally together.

The invention has for its object the provision of an improved form of pivotal connection between the links which enables links of a relatively thin section of metal to be employed without the metal of the links wearing at their pivotal connection after a period of use, while providing at the same time a substantial bearing area in the pivotal connection between each pair of links.

According to the present invention, the links are connected together by connecting elements of circular form in cross section extending transversely of the length of the chain, the elements being themselves connected pivotally together by bearings extending substantially continuously between the two links of each pair thereby connected, each element being connected to at least one link of a pair of links by forming the metal of the exterior of the element to non-circular section locally adjacent such link without cutting away any of the metal of the element so that the cross sectional area of the element at such position is substantially unchanged, such non-circular part of the element engaging non-rotatably the adjacent link.

By making each connecting element locally of non-circular cross section in this way, the strength of the element is not reduced locally so that there is no likelihood of the metal of the element thereby failing at such position during use, while at the same time a connection is provided between each element and the pair of links to which it is connected which effectively prevents relative rotation between such element and either of the links of such pair of links, which relative rotation if it occurs under load-transmitting conditions would, unless the links were made of very substantial thickness in a lateral direction, very rapidly lead to substantial deformation of the link where it was engaged rotatably by the element aforesaid.

At the same time by providing a pivotal connection between the elements having a bearing surface which extends substantially continuously between the two links of each associated pair of links connected, a substantial bearing area is provided between the pivotally connected elements which can withstand without appreciable wear the load to which the chain is subjected during use.

It is sufficient to provide a rotatable connec-

2 tion between each element aforesaid and only one of the two links of the associated pair of links, as the latter are themselves connected together at both of their ends, thus ensuring that a non-rotatable connection of the element to one link of each pair effectively precludes rotation between such element and the other link of the pair.

Referring to the drawings:

Figure 1 is a side elevation of part of a conveyor chain constructed in accordance with this invention.

Figures 2 and 3 are side elevations and plan views to an enlarged scale of a portion of part of the chain depicted in Figure 1.

Figures 4 and 5 are cross sectional views to an enlarged scale of the chain depicted in Figure 1 taken on the lines 4—4 and 5—5 respectively.

Figure 6:
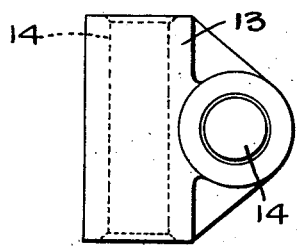
Figure 7:
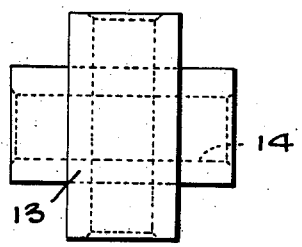

Figures 6 and 7 are side and end elevations of part of the construction depicted in Figure 4.

Figure 8:
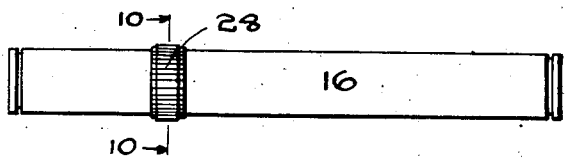
Figure 9:
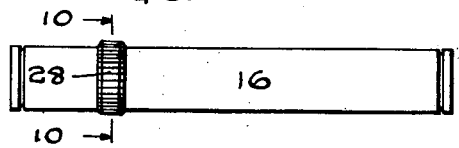

Figures 8 and 9 are views depicting certain parts of the construction shown in Figure 4.

Figure 10:
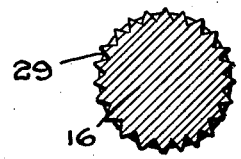

Figure 10 is a cross sectional view on the lines 10—10 of Figures 8 and 9.

Referring to the drawings, in Figure 1 there is depicted part of an endless chain for conveying goods or material, such chain being built up from a large number of pairs of links extending longitudinally of the chain, the links being all constructed as metal plates of elongated configuration and of relatively thin flat form in cross section, some of which links which are indicated at 10, serve merely as connecting links and are disposed with their planes horizontal, and other links, indicated at 11, which are disposed with their planes vertical serve both as connecting links and also as load-carrying links, the load or the means for advancing the load being suspended between the two links on some or all of these pairs of links 11, which links are provided with holes 12 as shown in Figure 2 for the attachment thereto of load-suspension devices not shown in the drawings.

The load-carrying links 11 are connected to the connecting links 10 by articulating means of the general form shown most clearly in Figures 6 and 7, the body being formed with two transverse holes 14 extending at right angles to one another, the holes being disposed in spaced parallel planes extending at right angles to the length of the adjacent part of the conveyor chain. The body 13 may be a casting or may be made of two tubes welded together at right angles to one another.

The holes 14 are of cylindrical form throughout substantially their entire length and provide bearings for vertically extending pins 16 and horizontally extending pins 17 of circular form in cross section, one of each of which pins is pivotally mounted in one of the two holes 14 of each body.

Both sets of pins extend an appreciable distance beyond the ends of the corresponding holes 14, and the vertically extending pins 16 extend adjacent to opposite ends of the holes 14 through holes 18 formed in the ends of the connecting links 10 of configuration corresponding to the external cross section of the pins 16, while the pins 17 extend similarly through corresponding holes formed in the ends of the load-carrying links 11.

The ends of the pins 16 and 17 project beyond the adjacent respective links and the extremities of the vertically extending pins 16, being rotatably mounted thereon for rotation about a vertical axis on the rollers 19 which serve to engage with vertical guide faces 20 provided on a track of cruciform shape in cross section, part of which is depicted at 31 in Figure 4, and the engagement between the rollers 19 and the guide faces 20 serves to guide the chain against lateral movement in a horizontal direction.

The extremities of the horizontally extending pins 17 have rotatably mounted thereon load-bearing rollers 21 which engage horizontal load-carrying surfaces 22 of the track aforesaid.

The rollers 19 and 21 are conveniently formed from sheet metal and are provided with antifriction ball bearings 23 by which the rollers are rotatably supported from sleeves 24, which sleeves are a free fit on the extremities of the corresponding pins, being secured in position by removable circlips 25, such an arrangement permitting of the ready replacement of a roller if desired.

The guide rollers 19 are spaced axially of their respective pins in relation to the adjacent connecting links 10, and the pins 16 carry distance sleeves 26 disposed between the sleeves 24 and wearing plates 27 provided on the exterior of the links, which distance sleeves 26 are adapted to be engaged by the teeth of a driving sprocket wheel not shown in the drawings.

In order to prevent wear of the holes 18 in the links 10, 11, through which the pins 16 and 17 extend, a non-rotatable connection is provided between the pins and one link of each pair of links through which the pins extend, and its non-rotatable connection is formed by knurling each pin locally where it is to engage with one of the two links as indicated at 28 in Figures 8 and 9, such knurling being effected by rolling the pin, with this particular part thereof in contact with a toothed rack, thereby deforming the metal of the pin locally to the cross sectional shape depicted in Figure 10 so that the pin is formed locally with a large number of axially extending ribs 29 which project above the surface of the pin, the ribs being spaced by axially extending grooves, such non-circular surface being formed without cutting away any metal of the pin so that the cross sectional area of the metal remains unchanged and the strength of the pin is not materially changed at such position.

After the knurling operation has been completed, the pin is case-hardened so as to harden the metal of the ribs 29, and the pin is positioned by sliding the end thereof more remote from the knurling through the holes in the end of the pair of links to be connected with the body 13 disposed therebetween, with its corresponding hole in register with the link holes, the pin being slid readily through these parts until the knurled portion thereof contacts the exterior of one of the two links, whereupon the pin is finally driven home to the position depicted in Figure 4, the hardened ribs 29 deforming the metal around the link hole 18 so as, in effect, to serrate the wall of the hole and provide a positive non-rotatable connection between the pin and this particular link. Afterwards the remaining parts may then be positioned on the extremities of the pin.

Preferably each pin is connected non-rotatably to a common link in the manner described, after which the other link is simply slid over the plain portion of the two pins, such an arrangement facilitating the assembly of the conveyor chain as the two pins are connected permanently together by the common link to form a connected assembly on which the rollers and the other parts can readily be mounted.

Such non-rotatable connection between each pin and one of the two links of a pair of links thereby connected effectively precludes rotation between the pin and both links since the latter are connected together at opposite ends of the links and consequently relative rotation between the two links cannot occur.

Furthermore, with the construction described, it would not be possible to assemble the parts if the pin were knurled adjacent its connection to both links prior to the insertion of the pin through the corresponding hole 14 in the body 13.

Thus a non-rotatable connection is provided between each pair of links and the pins which are themselves rotatable within the body 13, and any wear between such links and the pins which would occur more rapidly in the absence of such non-rotatable connection is avoided so that the links may be made of relatively thin section of metal whose minimum thickness is determined by the load to be carried by the chain.

In Figure 5 is depicted the method of connection employed between pairs of connecting links 10 only, that is to say in which no articulating means are provided between the links which are only required to pivot relatively about one axis, and, as will be seen from this figure, one pair of links is spaced apart by a greater distance than the other pair of links, the outer pair of links being connected non-rotatably in the manner above described to a vertically extending pin 16, the extremities of which carry guide rollers 19 as already described.

This pin 16 has pivotally mounted upon it centrally of its length a distance tube 30 forming the other element of the pivotal connection, one of which is constituted by the pin 16 aforesaid, and this distance tube is connected in any suitable manner non-rotatably to each of the inner pair of links, such non-rotatable connection precluding wear between the inner pair of links 10 and the distance tube.

By the term "relatively thin," in relation to the thickness of the strip material forming each link, is meant that the material is sufficiently thin as to permit of the hardened rib portion of the pin being driven axially through the link hole without significant, effective, deformation of the ribs, so that a positive non-rotatable connection is provided between the pin and the link into which such ribbed portion of the pin is driven.

What I claim then is:

1. A conveyor chain comprising a connecting body for joining together pairs of link chains at each end thereof, said body having a pair of mutually transversely disposed tubular bearings connected together, a connecting pin seated in each bearing and a chain link seated on the pin on each side of said bearing, the longitudinal axes of the respective pins being spaced from one another, each link being of strip material of relatively thin, flat form in cross section, and of substantially uniform thickness throughout its length, and having a hole extending transversely therethrough at each end, said connecting pin being of generally cylindrical form and extending through one hole in each link of each pair, each pin corresponding substantially in cross section to the diameter of the bore of the hole in said link, each pin having at one end a plurality of circumferentially arranged, spaced, mutually parallel ribs, extending parallel to the pin axis, at a position where said pin extends into one of said link holes, each of said ribs having a surface hardness greater than that of the material of the edge of the link hole into which the pin extends, the ribs on said pin indenting the material around said hole when the pin is driven into it and locking said pin and link against relative rotation, whereby relative rotation occurs only between the bearing and the pin, each pin projecting beyond the respective link on each side thereof, and a roller seated on the projecting end of each pin.

2. A device according to claim 1, in which the ribs of each pin have a length corresponding to the thickness of the link through which it extends.

3. A device according to claim 1, in which the diameter of said pin across a pair of diametrically opposed ribs is greater than the minimum diameter of the link hole when the ribbed portion of the pin is in position therein, the material of the link at said hole edge extending between each adjacent rib.

4. A device according to claim 1 in which the cross sectional area of said pin at the ribbed portion thereof is substantially the same as the cross sectional area of the remainder of the pin.

5. A device according to claim 1 in which the pin is of uniform diameter throughout its length except at said ribbed portion.

6. A device according to claim 1 in which the pin diameter across a pair of diametrically opposed ribs is greater than the minimum diameter of said link hole when the ribbed portion of the pin is in position therein, the cross sectional area of said pin at the ribbed portion being substantially the same as the cross sectional area of the remainder of said pin.

OLAF JOHN BARCLAY ORWIN.

References Cited in the file of this patent

UNITED STATES PATENTS

| Number | Name | Date |
| --- | --- | --- |
| 863,079 | Meyer | Aug. 13, 1907 |
| 1,804,701 | Mojonnier | May 12, 1931 |
| 2,298,386 | Jennings | Oct. 13, 1942 |

FOREIGN PATENTS

| Number | Country | Date |
| --- | --- | --- |
| 440,796 | Germany | Feb. 16, 1927 |